Jan. 2, 1968  E. F. BEEZER  3,361,032
CAM FORMING MACHINE
Filed Aug. 12, 1965  3 Sheets-Sheet 1

INVENTOR
EARL F. BEEZER

*Moses, McGlew and Toren*
ATTORNEYS

INVENTOR
EARL F. BEEZER

Jan. 2, 1968  E. F. BEEZER  3,361,032

CAM FORMING MACHINE

Filed Aug. 12, 1965  3 Sheets-Sheet 3

INVENTOR
EARL F. BEEZER

ATTORNEYS

3,361,032
CAM FORMING MACHINE
Earl F. Beezer, 75 Hemlock Drive,
Paramus, N.J. 07652
Filed Aug. 12, 1965, Ser. No. 479,154
2 Claims. (Cl. 90—13.9)

This invention relates in general to forming or shaping machines and, in particular, to a new and useful device for machining plate or disc type cams having a simple construction of mounting member for the cam blank or workpiece and with simple means for controlling the rotation and movement of the workpiece in respect to a cutter.

The present invention provides a device which may be employed separately or incorporated with an existing milling machine for facilitating the cutting of a disc type or plate type cam. The present invention is an improvement over the prior art particularly in respect to the simple mounting means for the workpiece and to the means for effecting the rotation and movement of the workpiece in connection with a stationary cutter for forming the desired profile. In accordance with the invention, the workpiece is mounted on a rotatable mounting member which is mounted together with its driving motor and drive gearing on a supporting rod member. The mounting is by means of linear ball bearings which permits displacement of the mounting member with the workpiece in respect to a horizontally fixed cutter. The mounting member also advantageously includes a control cam or master cam which rotates with the member and which is adapted to engage a stationary roller for the purpose of moving the mounting member along its support in relation to a cutter for forming the desired profile on the workpiece to be machined. A feature of the invention is the provision of a simple linear ball bearing mounting arrangement for the mounting member for the workpiece and its driving mechanism as well as for the cam control for effecting its controlled movement in respect to a stationary cutter.

A further feature of the invention is the provision of means for biasing the mounting member and the control cam such that the control cam is urged into engagement with the roller follower during the operation of the device. The biasing means includes a fluid pressure element advantageously including a cylinder which is urged in a direction for the engagement of the cam with the roller follower by fluid pressure which is advantageously oil pressure. The invention provides a simple and inexpensive device for facilitating the machining of plate cams or disc cams, which device may be constructed as a simple machine or as a unit which may be readily adapted for use with the existing milling machines.

Accordingly, it is an object of the invention to provide a simple device for milling disc or plate type cams which includes a mounting member which, together with its driving means for rotating the member, is mounted for sliding movement on a mounting element such as a rod member for rolling movement and with hydraulic pressure means for urging the mounting member in a direction such that a control cam on the member is urged into engagement with a tracing roller so that the mounting member will be displaced in respect to a stationary cutter during its operation.

A further object of the invention is to provide a cam forming device which is simple in design, economical to manufacture and rugged in construction.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
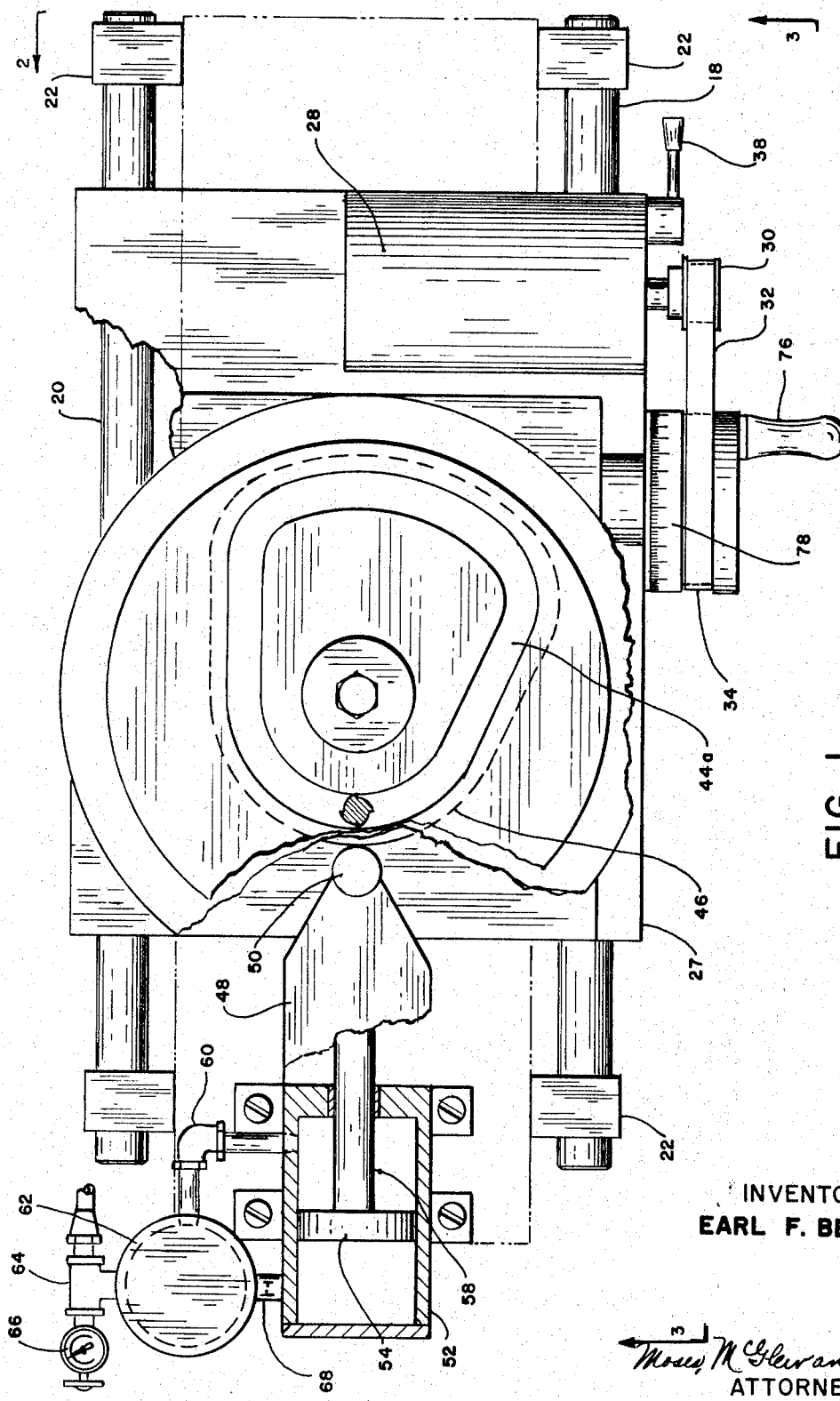
FIG. 1 is a partial top plan view and partial sectional view of a device for machining plate or disc cams constructed in accordance with the invention.

Referring to the drawings in particular, the invention embodied therein comprises a device for machining disc or plate cams generally designated 10, which in the embodiment illustrated is incorporated or mounted upon a base 12 of a milling machine which includes an overhead or arm portion 14 which carries a rotatable cutter 16 which may be oriented in a fixed horizontal position but may be reciprocated vertically.

In accordance with the invention the device 10 includes slide guides or supporting rod members 18 and 20 which are mounted on bracket elements 22 on respective sides of a movable slide 24 of the milling machine. The rods 18 and 20 are fixed, hardened and ground shafts.

In accordance with a feature of the invention, a workpiece mounting assembly 24 is mounted on the rod element by means of collar elements 25 and 26. The collar element 25 contains two sets of linear ball bearings 25a, 25a arranged in end to end relationship and is located at the forward end adjacent the cutter 16 in a position in which the maximum stresses will be located. The collar element 26 contains a single set of linear ball bearings and the entire assembly, including the mounting assembly 24 and its driving transmission, is supported on the rods 18 and 20 for linear back and forth movement in relation to the cutter 16.

The mounting assembly 24 includes a supporting plate 27 upon which is mounted a variable speed motor 28 which drives toothed pulley 30, toothed belt 32, toothed pulley 34 and a drive worm shaft 36. The speed of the motor 28 may be varied by a control lever 38. The rotation of the shaft 36 is effected through internal gearing, for example a worm (not shown), on shaft 36 to drive a gear (not shown) carried on a rotatable table or workpiece supporting member 40. The outer or upper end of the workpiece mounting member includes means such as a clamping bolt and plate member 42 for securing a workpiece 44 (FIGS. 1 and 2) thereon in position for operation thereon by the cutter 16.

Figure 2:
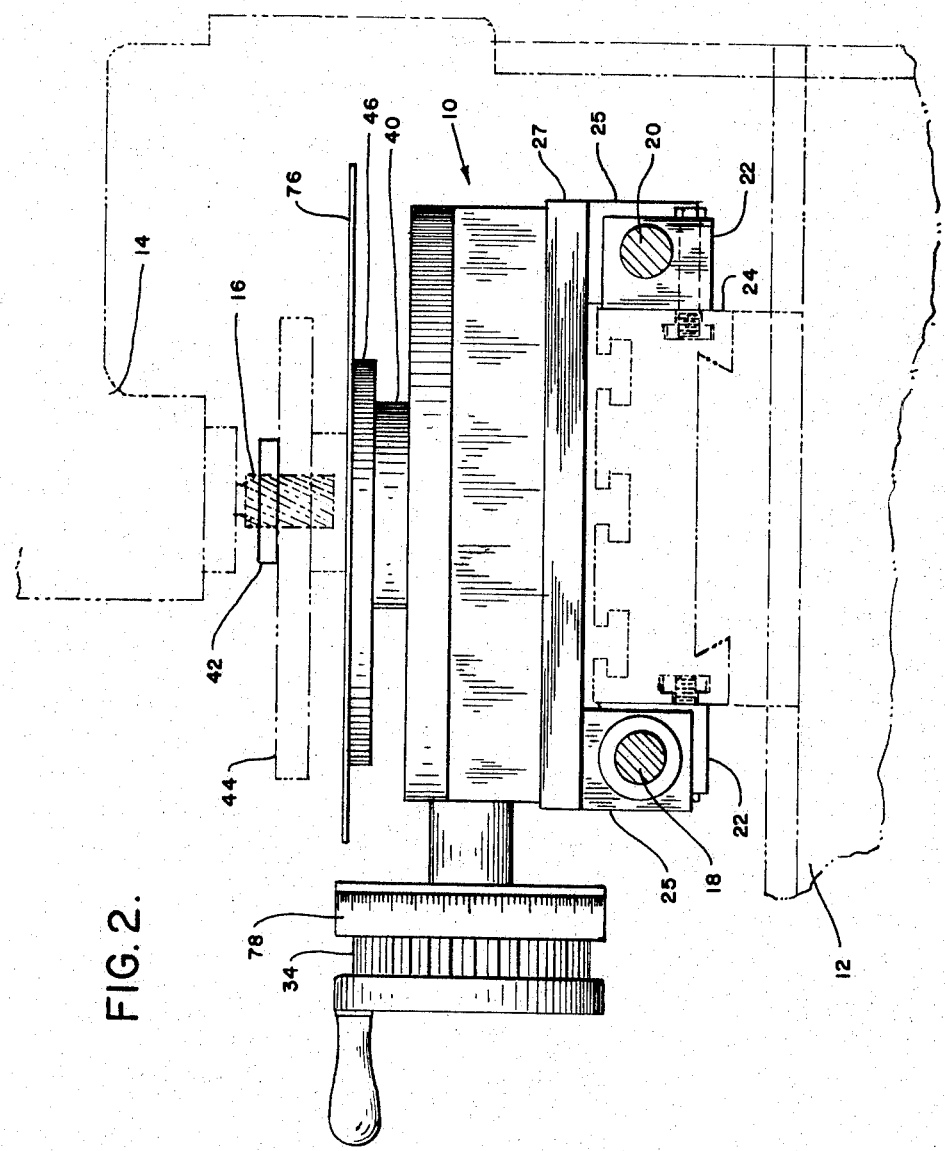
FIG. 2 is a section taken on the line 2—2 of FIG. 1.

A further feature of the invention is the provision of a control cam means which in the embodiment illustrated includes a control cam element 46 which is carried directly by the workpiece mounting member 40. Directly adjacent the cam 46 there is mounted on a bracket 48 a stationary roller follower 50. The complete mounting member assembly 24 is urged in a direction to maintain the cam 46 in contact with the roller follower 50 by fluid control means which includes a fluid cylinder 52 in which is slidable a piston 54. The piston 54 connected to a connecting rod 56 which is connected at its outer end to the assembly 24. A hydraulic substance, such as oil under pressure, is admitted into the cylinder 52 on the right side in the chamber 58, as indicated in FIG. 1, to urge the piston 54 to the left and to cause the whole assembly to be similarly urged through the connection of the piston rod 56. A hydraulic oil is advantageously admitted through the connecting line 60 from a reservoir 62 which is maintained under pressure at the upper portion through an air pressure line 64 having a pressure gauge 66. A return line from the cylinder 52 to the reservoir 62 is indicated at 68.

The pressure in the chamber 58 of the cylinder 52 is regulated so that the cam 46 is maintained in contact with the roller 50 during the cutting operation.

Figure 3:
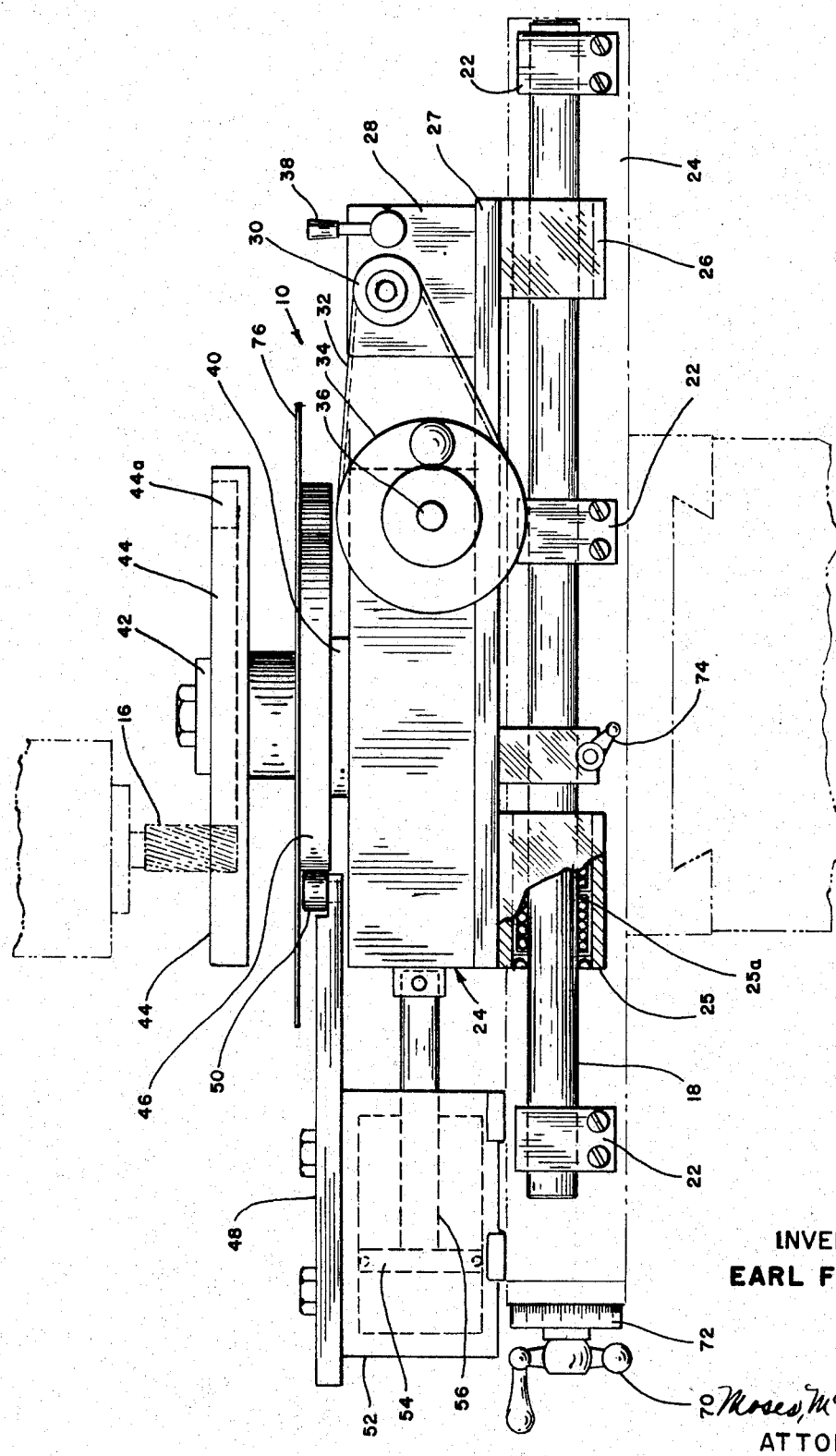
FIG. 3 is a side elevational view of the device indicated in FIG. 1.

For automatic operation the workpiece 44 is clamped on the workpiece holding member 40 below the cutter 16. The motor 28 is started and the speed regulated by the lever 38 to cause the workpiece holding member 40 to be rotated and to be moved by the cam means 46 and 50 to effect the cutting of a cam outline such as a groove 44a, as indicated in FIGS. 1 and 3, or an end profile, as indicated on the workpiece 44' in FIG. 2, in accordance with which type of cam is being made. The complete assembly 24 including the driving motor and gears and the cam 46 will be moved backwardly and forwardly along the rods 18 and 20 in smooth gliding linear movement by the linearly recirculated ball bearings which are arranged in the journals 25 and 26 to withstand heavy cutting forces. During this time the piston 54 will act on the assembly 24 to hold the cam 46 in smooth engagement with the roller 50 and will actually carry out the movement of the assembly in respect to the cutter 16 when the control cam 46 provides for the cutting of a "fall" upon the workpiece.

The use of a liquid such as oil in pressurizing the piston 54 and the whole assembly 24 will permit the easy absorption of the intermittent thrust forces which act during cutting without any vibrations being produced.

If it is desired to use the machine to cut cams or other members intermittently, the carriage 24 may be displaced in respect to the cutter 16 by means of a hand control wheel 70 having a scale 72 associated therewith for accurate positioning in the case of the making of a master cam for example by manual operation. It is also desirable to have the slide movable in this manner in order to make rough cuts and positioning cuts. Because the entire assembly 24 is slidable on linear ball bearings, the slide is essentially friction free and not subject to sliding friction which will tend to bind the assembly. Such is particularly desirable when a master cam having a particularly high pressure angle would cause the movement of the assembly 24 correspondingly. With the linear ball bearing construction there will be no inducing of said forces which could destroy the accuracy of the device and bind the movement of the elements. Because the master or control cam 46 and the workpiece 44 are on the same mounting member and center of rotation, there will be no back lash possibility or any variation in timing which may be caused by any gear or other driving arrangements. The entire assembly 24 may be locked in position by means of an operating clamping lever 74 so that movement relative to the cutter 16 may be effected by moving the slide 24.

In most instances it is desirable to have a chip guard 76 mounted below the workpiece 44 and above the control cam 46 so that the control cam will not be subjected to fouling or pitting by the cutting operation.

When using the unit for hand operation, the clamping lever 74 is locked to lock the assembly 24 in a fixed position. The vari-speed motor 28 is then placed in a neutral condition allowing a hand wheel 76 secured to the shaft 36 to be rotated for rotating the member 40 with the workpiece 44 angularly to permit cutting at each angle indexed. The hand wheel 70 is then manipulated to shift the mounting member 40 in respect to the cutter 16 for effecting each successive plunging cutting stroke. By following a chart for the outline of the cam to be cut, it is possible to make a cut at each of the indexed positions in succession, and after all of the cutting is done, the scallops between the cuts are removed such as by grinding. A dial 78 is associated with the hand wheel 76 to provide an indication of the angular position of the workpiece 44 during each indexing for cutting purposes.

While a specific embodiment of the invention has been shown and described in detail to illustrate the application of the inventive principles, it will be understood that the invention may be embodied otherwise without departing from such principles.

What is claimed is:

1. A cam forming machine comprising a rotatable cutter, a mounting assembly, a rotatable workpiece mounting member in said assembly having means thereon for mounting a workpiece in a position for operation thereon by said cutter, means mounting said workpiece mounting assembly for movement toward and away from said cutter including means supporting said assembly for rolling linear movement comprising a supporting rod member and journal means on said rod member having linear ball bearings therein, a control cam connected to said workpiece mounting member and rotatable therewith for moving said mounting assembly toward and away from said cutter, a follower mounted in a fixed position adjacent said cam and engageable therewith, drive means on said assembly to rotate said mounting member at a definite predetermined speed including a variable speed motor and gear means connected between said motor and said mounting member, and fluid pressure means connected to said mounting member and acting thereon to urge said follower into cooperative engagement with said control cam as said mounting member is rotated for displacing said mounting assembly in respect to said cutter; a supporting carriage for said assembly carriage, means mounting said supporting carriage for lateral movement, means for shifting said control carriage in precise amounts in respect to said cutter, and means for locking said assembly in respect to said carriage.

2. A cam forming machine comprising a rotatable cutter, a mounting assembly, a rotatable workpiece mounting member in said assembly having means thereon for mounting a workpiece in a position for operation thereon by said cutter, means mounting said workpiece mounting assembly for movement toward and away from said cutter including means supporting said assembly for rolling linear movement, a control cam connected to said workpiece mounting member and rotatable therewith for moving said mounting assembly toward and away from said cutter, a follower mounted in a fixed position adjacent said cam and engageable therewith, drive means on said assembly to rotate said mounting member at a definite predetermined speed, and fluid pressure means connected to said mounting member and acting thereon to urge said follower into cooperative engagement with said control cam as said mounting member is rotated for displacing said mounting assembly in respect to said cutter; a supporting carriage for said assembly carriage, means mounting said supporting carriage for lateral movement, means for shifting said control carriage in precise amounts in respect to said cutter, and means for locking said assembly in respect to said carriage.

References Cited

UNITED STATES PATENTS

| 2,866,390 | 12/1958 | McCadden | 90—13.4 |
| 3,224,340 | 12/1965 | Wahlstrom | 90—13.7 |

FOREIGN PATENTS

| 395,978 | 7/1933 | Great Britain. |
| 534,717 | 3/1941 | Great Britain. |

GERALD A. DOST, *Primary Examiner.*